July 14, 1925.
O. M. KIRLIN
1,546,084
AUTOMATIC AIR VALVE
Filed Aug. 27, 1923
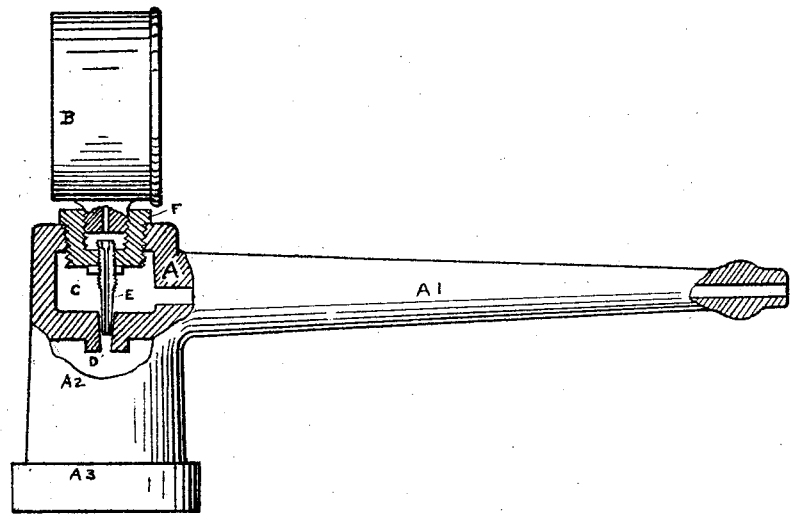

Patented July 14, 1925.

1,546,084

UNITED STATES PATENT OFFICE.

OTIS M. KIRLIN, OF WATERTOWN, SOUTH DAKOTA.

AUTOMATIC AIR VALVE.

Application filed August 27, 1923. Serial No. 659,695.

*To all whom it may concern:*

Be it known that I, OTIS M. KIRLIN, a citizen of the United States, residing at Watertown, in the county of Codington and State of South Dakota, have invented a new and useful Automatic Air Valve, of which the following is a specification.

My invention relates to improvements in automatic air valves used for the inflating of pneumatic tires and similar purposes, and having as a part thereof a pressure indicating gauge and device in connection therewith to show the air pressure inside the tire as it is being inflated.

I attain this object by means of the novel construction shown in the accompanying drawing.

The figure shows the air valve with a part broken away to show its internal construction; A being the body, or casing, with one end formed as a tube $A^1$ and adapted to connect to a hose supplying the compressed air; the other end $A^2$ having at one side an automatic valve in a head $A^3$ adapted to connect with the inlet tube of a pneumatic tire for inflating it with air in the usual manner, and having at the opposite side a pressure indicating gauge B for showing the pressure of air in the tire while it is being inflated, and also showing the air pressure in the supply hose when not in use.

Air chamber C is adapted to receive the air from compressor or storage tank and transmit it through the annular channel D to the head $A^3$ for delivery to the tire; annular channel D loosely encloses the tapered end of tube E and is itself tapered to conform therewith, tube E being at its other end adjustably connected to head F upon which is mounted gauge B, the air pressure upon gauge being received through tube E.

To operate, the delivery head is applied to the tire in usual manner and upon the release of air through the valve contained in delivery head the following air in its passage through the restricted space of channel enclosing the end of tube E creates a suction effect in tube E and reduces the pressure on gauge B, the reduction in pressure being adapted to being varied by the longitudinal adjustment of tube E in channel D, and the "tuning" or varying of position of tube E in channel D tending to cause the gauge to indicate in accordance with the pressure in tire, Area of space between tube E and channel D being less than area of inlet to tire the pressure at delivery head does not greatly exceed that inside the tire being charged and the suction effect of air rapidly passing tapered end of tube E tends to reduce the effective pressure upon gauge B through tube E and cause it to indicate correctly the pressure in tire.

It is apparent that the same object may be accomplished by having the air pass through the tube E and connection to gauge B from the space surrounding the tube though the form of construction as shown in the drawing is considered preferable.

To obtain accuracy with this device, several conditions are necessary, to wit: the supply from the charging tank must be substantially constant and the tire valves must be assumed to be of substantially a constant character. The latter feature is not serious for the reason that standard uniform charging tire valves are in general use. With the conditions just noted, there will always be a predetermined velocity in the flow of air to the tire, and such flow will have a predetermined influence on the gauge B, which latter will be calibrated for a predetermined supply pressure which, in the supply tank may be assumed to be one hundred and fifty (150) pounds. A tire will never be charged anywhere near to the maximum pressure of one hundred and fifty pounds, but for example only to forty (40) pounds, and hence the difference between one hundred and fifty pounds and forty pounds will produce very considerable velocity in the flow of air up to the time the tire is completely charged. Of course, the flow of air required to give the required indication on the gauge may be corrected by adjustments of the nipple G.

With this device used as described, there is therefore during the entire time of charging the tire a quite rapid flow of air which has a definite relation to the difference in the charging pressure and the tire pressure, and if the charging pressure be determined and maintained substantially constant the rate of flow can be relied upon to indicate the tire pressure.

Having fully described my invention, what I claim is:

1. The combination with a valve casing having an air chamber with an air inlet and an air outlet, said air chamber having a restricted passageway between said air inlet and air outlet, a pressure gauge, and a constantly open tube reducing the size of said passageway and leading directly therefrom to the pressure gauge.

2. The structure defined in claim 1 in which said tube is endwise adjustable to vary the size of said passageway.

3. The combination with a valve casing having an air chamber with an air inlet and an air outlet, said air chamber having a restricted tapered passageway between said air inlet and air outlet, a pressure gauge, and an endwise adjustable tapered tube extending into said tapered passageway and leading directly therefrom to the pressure gauge.

4. The combination with a valve casing having an air chamber with an air inlet and an air outlet, said air chamber having a tapered restricted passageway between said air inlet and air outlet, a bushing in said casing, a gauge attached to the bushing, and an endwise adjustable tapered tube having screw-threaded engagement with the bushing and leading from the passageway to the pressure gauge.

OTIS M. KIRLIN.

Witnesses:
HENRY CLASEN,
CHAS. ERBE.